Aug. 26, 1924.
W. H. DROUGHT
ANIMAL TRAP
Filed Jan. 3, 1922
1,505,996
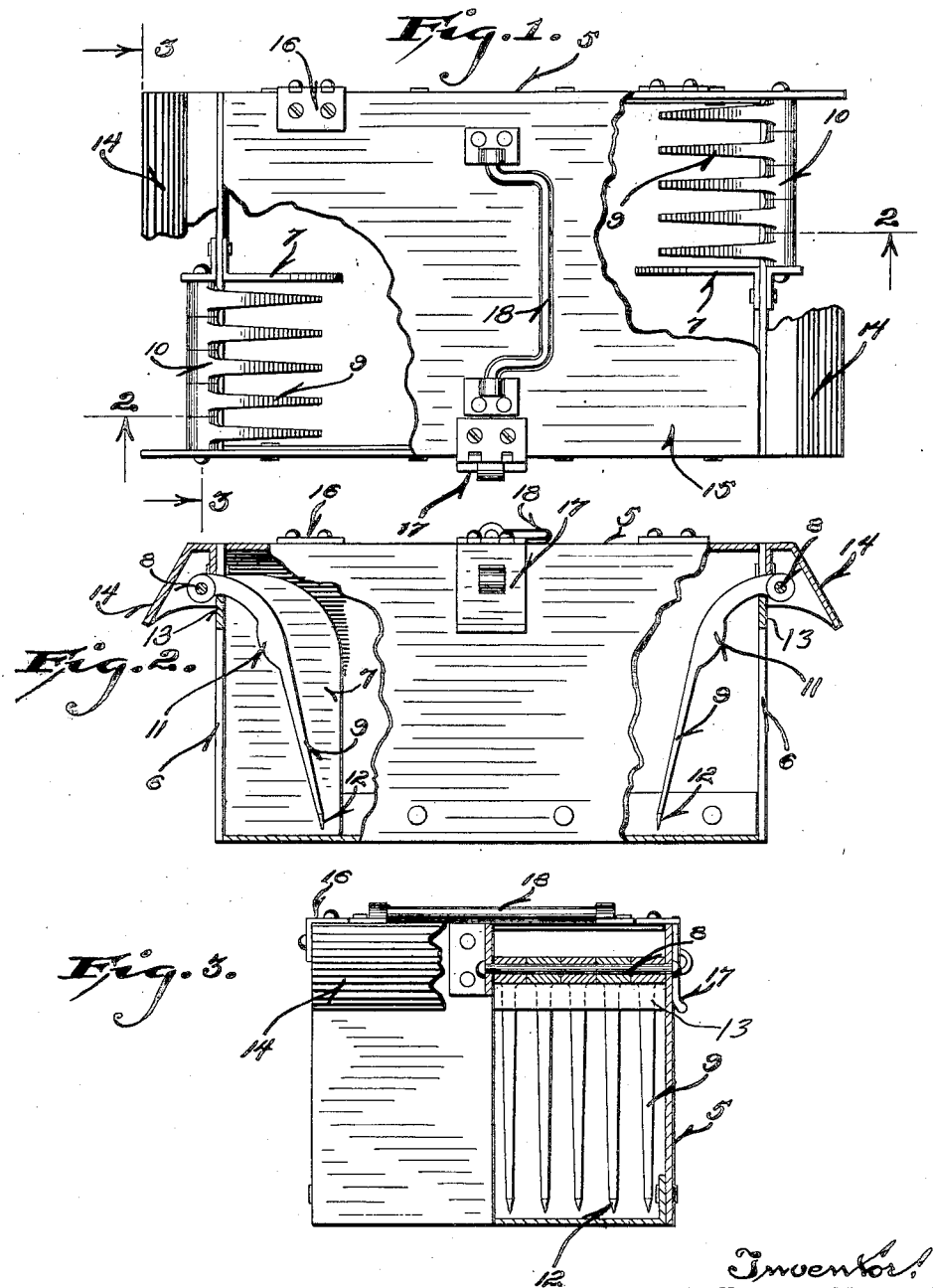

Patented Aug. 26, 1924.

1,505,996

UNITED STATES PATENT OFFICE.

WILLIAM H. DROUGHT, OF WATERTOWN, WISCONSIN.

ANIMAL TRAP.

Application filed January 3, 1922. Serial No. 526,626.

*To all whom it may concern:*

Be it known that I, WILLIAM H. DROUGHT, a citizen of the United States, and resident of Watertown, in the county of Jefferson and State of Wisconsin, have invented certain new and useful Improvements in Animal Traps; and I do hereby declare that the following is a full, clear, and exact description thereof.

My invention relates to animal traps of the type which is adapted to catch the animal alive.

The general object of the invention is the provision of a device of this type which may be easily manufactured from inexpensive material and easily set.

A more specific object of the invention is to provide means whereby the animal will be prevented from escaping in case it should become frightened, after it has partially entered the trap.

A still further object of the invention is the provision of suitable means for protecting the operative mechanism from rain, sleet, or the like, so that the same is adapted to be used out of doors in all kinds of weather, and will be always in operative condition.

In describing my invention, reference will be had to the accompanying drawing, in which—

Figure 1 is a plan view of the invention with parts broken away to show the interior construction.

Figure 2 is an elevational view with parts thereof shown in section, as indicated by the line 2—2 of Figure 1, and Figure 3 is an end view partly in section on the line 3—3 of Figure 1.

Referring more specifically to the drawing, the invention comprises a box 5 which may be of any suitable shape and size according to the animal which it is desired to trap. This box is provided with one or more entrance openings 6 and leading inwardly from each opening is a passage way which may be conveniently formed between the wall 7 and the side wall of the box. Above the entrance opening 6 is suitably secured a pivot pin 8 on which are independently pivoted a series of teeth 9, the bearing portions 10 thereof being enlarged so as to form suitable spacing means for the teeth. Each tooth is provided with an enlarged or weighted portion 11, so that normally the teeth are held by gravity in their lowermost position. The ends of the teeth are provided with sharp points 12, and in order to prevent the points from striking the bottom of the box, a strip 13 extends across the end of the box in front of the pivot pin 8 and supports the teeth with their points just clear from the bottom.

A hood 14 is secured to the end of the box and extends outwardly over the entrance to the box and above the pivot pin 8 in order that the same may always be protected from the weather and maintained in operative condition. The cover 15 of the box is preferably hinged, as shown at 16, so as to provide ready access to the inside thereof, and a suitable hasp or locking means 17 is provided to secure the same in closed position. A handle 18 may also be provided for convenience in carrying the trap from place to place.

In the operation of the invention, the bait will be secured in any manner preferably in front of the opening. The animal, upon entering, will raise a sufficient number of the teeth 9 to permit its passage into the box, and in case the animal should become frightened and seek to retreat, the sharp points 12 will immediately pierce it and prevent its escape. The hood 14 will not only protect the teeth and their pivots in stormy weather, but will also form a shelter to prevent the entrance opening from being closed up by snow, leaves, or the like.

While I have shown and described the specific structure of one form in which my invention may be embodied, it will be understood that various changes may be made in the minor details thereof, and in the size and shape thereof without departing from the scope of the invention as claimed.

I claim:

An animal trap comprising a casing having an entrance opening therein, a pivot pin located above said opening, a plurality of prongs independently pivoted adjacent each other upon said pin, a shield positioned above said pivot pin, each of said prongs having a curved end portion in which said pivot pin is mounted, a straight portion extending from said curved portion, and a weight formed integral with said prong at the junction of said curved and straight portions.

In testimony that I claim the foregoing I have hereunto set my hand at Watertown, in the county of Jefferson and State of Wisconsin.

WILLIAM H. DROUGHT.